United States Patent [19]
Schmidt et al.

[11] Patent Number: 5,857,333
[45] Date of Patent: Jan. 12, 1999

[54] CONTROL SYSTEM FOR HYDRAULIC POWER UNITS

[75] Inventors: Stefan Schmidt; Michael Reinert; Joachim Neumann, all of Lohr am Main, Germany

[73] Assignee: Mannesmann Rexroth GmbH, Lohr, Germany

[21] Appl. No.: 776,736

[22] PCT Filed: Aug. 11, 1995

[86] PCT No.: PCT/EP95/03192

§ 371 Date: Aug. 8, 1997

§ 102(e) Date: Aug. 8, 1997

[87] PCT Pub. No.: WO96/05543

PCT Pub. Date: Feb. 22, 1996

[30] Foreign Application Priority Data

Aug. 12, 1994 [DE] Germany ............ 44 28 691.0

[51] Int. Cl.$^6$ ............ F16D 31/02; F15B 13/16
[52] U.S. Cl. ............ 60/469; 91/361
[58] Field of Search ............ 91/358 R, 361, 91/364, 392; 60/469

[56] References Cited

U.S. PATENT DOCUMENTS

| | | | |
|---|---|---|---|
| 4,336,745 | 6/1982 | Lund | 91/361 X |
| 4,712,470 | 12/1987 | Schmitz | 91/361 X |
| 5,140,895 | 8/1992 | Imanishi | 91/361 |
| 5,230,272 | 7/1993 | Schmitz | 91/361 |

FOREIGN PATENT DOCUMENTS

| | | | |
|---|---|---|---|
| 308762 | 3/1989 | European Pat. Off. | |
| 2494785 | 5/1982 | France. | |
| 3532931 | 4/1987 | Germany. | |
| 928093 | 9/1980 | U.S.S.R. | 91/361 |

OTHER PUBLICATIONS

Patent Abstracts or Japan vol. 16, No. 36 (M–1205), 31 Oct. 1991 & JP,A,03 244804 (Daikin Ind Ltd) 31 Oct. 1991.

*Primary Examiner*—Hoang Nguyen
*Attorney, Agent, or Firm*—Emrich & Dithmar

[57] ABSTRACT

The present invention relates to a control system for hydraulic power units, in particular hydraulic cylinder-piston-assemblies comprising a valve to be controlled by an electronic controller, the valve controlling the fluid path between the power unit, a pressure source and a reservoir. A pressure sensor and a circuit for differentiating the sensed pressure quantity in response to time is provided for sensing a respective output variable of the power unit. The pressure variation signal is utilized to assist operating the valve to improve the control operation, i.e. to dampen fluid vibrations or to decrease the hammering noise produced in the operation of stamping, nibbling or shearing machines.

8 Claims, 1 Drawing Sheet

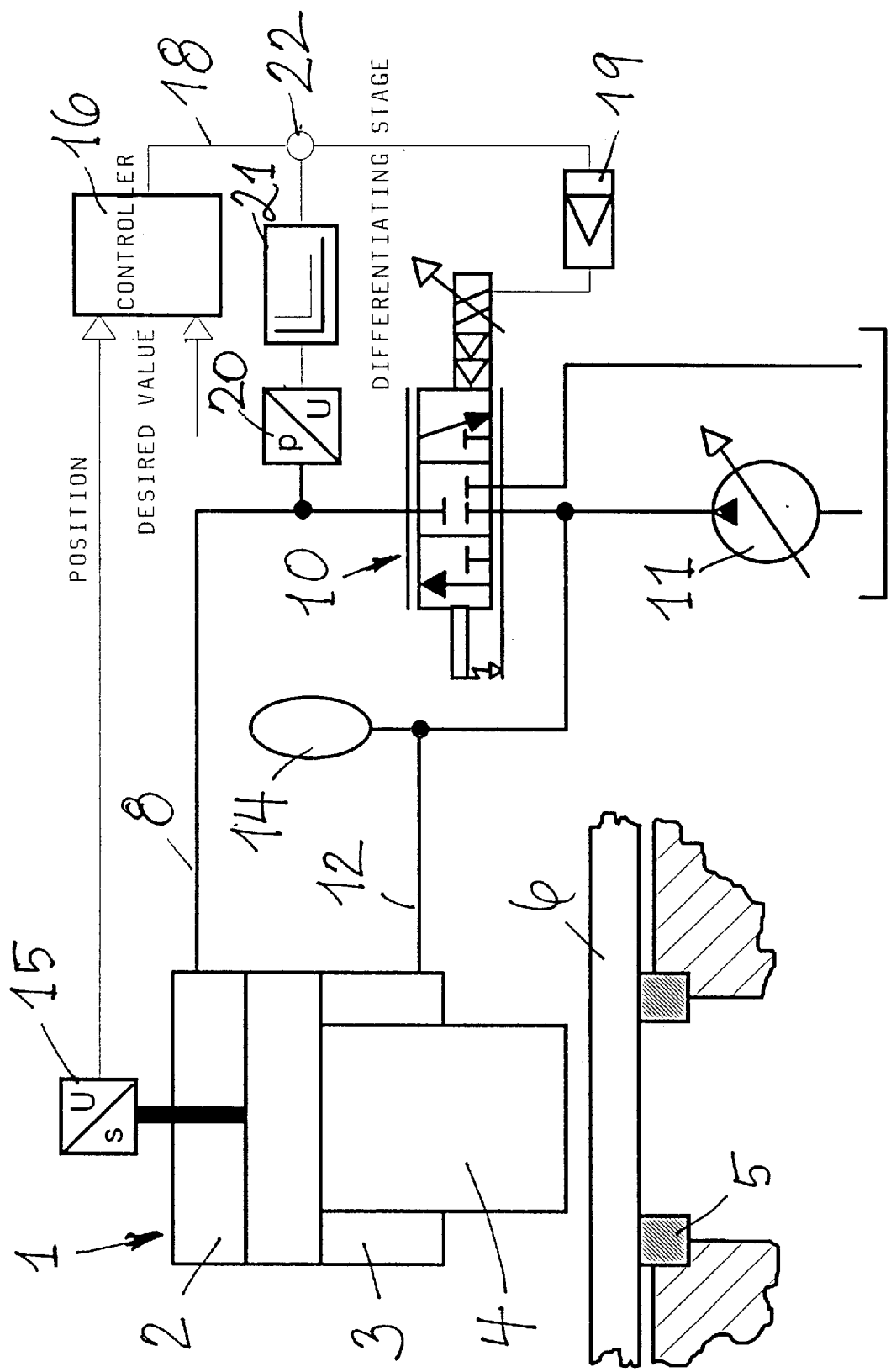

CONTROL SYSTEM FOR HYDRAULIC POWER UNITS

BACKGROUND OF THE INVENTION

Hydraulic piston cylinder assemblies are often equipped with a closed loop system controlling the position, the pressure, the force or the speed of the unit. Accordingly the piston stroke for example is determined by a distance transducer and this actual quantity as measured and a desired value are delivered to an electronic controller generating an error signal from both quantities and generating therefrom a positioning variable for controlling a valve controlling the fluid path between the power unit, a fluid pressure source and a reservoir.

The quality of the control system can be improved by feeding back certain output variables in a closed loop.

For example, output variables such as the speed and the acceleration of the power unit are fed back for improving a position control.

The output variables are sensed or, respectively are calculated in using a model generator. Due to the quality of the distance signals a differentiation does usually not result in any improvement.

In piston cylinder assemblies having one-sided or two-sided piston rods the differential pressure in both cylinder chambers can be used for an output variable control.

However, certain operative conditions of hydraulic power units cannot be appropriately controlled by merely sensing the distance, the speed, the acceleration or sensing the differential pressure. In the return stroke of a large press, for example, the open valve for decompressing and returning the fluid displaced from the cylinder space to the reservoir may cause severe vibrations, in particular in elongate pipe lines or, respectively in large fluid volumina which vibrations cannot be counterarted by any known speed or acceleration feedback means since the output variables required are scarcely to be measured. This is particularly true for the output variable control of low frequency hydraulic power units including plunger cylinders which are not equipped with an appropriate distance sensing system. A further application is noise reduction of hydraulic power units, for example in stamping and nibbling machines. Here the noise primarily is generated the tool breaks through the material. Breaking through under load results in a high acceleration of the piston resulting in loud noise.

SUMMARY OF THE INVENTION

An object of the invention is to provide a control system for dampening low frequency hydraulic power units and/or dampening vibrations occurring in voluminous spaces or voluminous pipelines, in particular for dampening the cutting noise of high frequency power units.

According to the invention, the output variable to be required for the dampening operation is sensed by measuring the hydraulic pressure and the pressure signal is differentiated to generate a pressure signal variation. This pressure variation signal is directly proportional to the variation of the acceleration. According to the invention it is thus not intended to deduce the acceleration variation from the conventional position control or a model. Rather the output variable p i.e. the pressure variation which is proportional to a variation of the acceleration is determined and this very signal is used for controlling the valve. Determining and processing the pressure gradient can be easily conducted in both analog and digital electronic controllers. The pressure can be measured very simply.

The sensed pressure signal can be differentiated one or more times. A single differentiating step is always possible according to experience, whereas a multiple differentiating operation means that rather small disturbance variables will be amplified to an extent such that further utilizing the signal may result in problems. It is thus preferred to generate multiple differentiation signals in a mathematical model to which the pressure signal sensed is delivered and which model resembles the control characteristics of the power unit as is known. Accordingly the differentiation step becomes independent of the disturbance variables as referred to above.

For example, the present invention may be used for dampening vibrations of pipelines in forging presses and other large presses, for example, i.e. low frequency hydraulic power units incorporating high fluid volumina. The dampening operations or frequency increase according to the invention results in a substantial improvement of the hydraulic control, for example to reduce the cycle times of presses. A specific application refers to dampening the shearing noise of nibbling machines. Accordingly the load pressure is sensed and differentiated and superimposed to the positional signal of the position control sensitive as to direction such that the valve closes in proportion to the pressure dropping speed or, respectively, opens in the reverse direction.

Thus an active dampening action of the breaking through impact and thus an effective noise reduction is obtained. According to the invention, the speed decrease during the temporarily closing time of the valve is rather short.

Principally the breaking-through-point may be determined by the electronic controller merely based on sensing the load pressure. Consequently, closing the valve can be controlled in response to a logic circuitry memorizing the desired valve variables, the operative variables of the material such as the thickness of the sheet, the type of material and characteristics of the respective tool to be used. Thus the control signals delivered to the valve must be determined by performing a test series. Applicants feel entitled to characterize a control method of this type in an independent claim. To be sure, however, the control method according to the invention should be superior as the sensed pressure will be differentiated and the positional signal is superimposed by the pressure variation signal. A combination of both methods should be appropriate to improve the efficiency of the feedback loop.

DESCRIPTION OF THE DRAWING

The foregoing and other objects, features and advantages of the present invention will become apparent in the light of the following detailed description of an exemplary embodiment thereof as illustrated in the accompanying drawing which shows a diagram of a control system for noise dampening of a nibbling machine.

DESCRIPTION OF THE PREFERRED EMBODIMENT

The power unit shown is implemented by a hydraulic cylinder 1 including a chamber 2 adjacent the piston end face and a chamber 3 located at the piston rod side of the piston. A plunger 4 is operated to shear a workpiece 6 placed on a die 5. The upper chamber 2 is connected through a line 8 and a proportional directional valve 10 to a fluid pressure source, i.e. a variable displacement pump 11 including an accumulator 14. The piston rod sided chamber 3 is connected through a line 12 to the pump 11.

The power unit 1 is provided with a positional control. Thus a distance transducer 15 is provided delivering a signal in response to the stroke of the plunger 4 defining an actual quantity signal relating to the position. A controller 16 generates a deviation signal in combining the actual quantity signal and a desired signal defining a desired position of the plunger. In response to the deviation signal a positional signal is generated which is supplied through the line 18 to the driver stage 19 of the valve 10.

While performing the stamping stroke the proportional valve 10 is adjusted such that the pressure fluid from the pump 11 is supplied through the line 8 to the cylinder chamber 2 for urging the plunger 4 downwardly. The fluid displaced from the lower chamber 3 also flows towards the valve 10. When the plunger 4 contacts the workpiece 6, the load pressure in the line 8 correspondingly increases. This pressure is sensed by a pressure sensor 20 and a pressure variation signal is generated in the differentiating stage 21 which signal is superimposed to the positioning signal for the valve 10 at the adding point 22. The pressure variation signal provided by the differentiating stage 21 is superimposed to the positioning signal carried on the line 18 such that the pressure drop in breaking through the material results in a closing of the valve 10, or, respectively an opening of the valve in the reverse direction, i.e. the operation of the valve is sensitive to the direction of the pressure variation signal.

The control system shown is further provided for dampening vibrations of the fluid and of low frequency hydraulic power units. Accordingly, the valve is controlled by the positioning signal of the controller to which the pressure variation signal has been superimposed such that the vibrations are dampened to improve the operation of the hydraulic assembly.

As mentioned before, the pressure signal sensed can be differentiated more than a single time. For this the signal p supplied from the differentiating stage 21 is fed to a second differentiating stage (not shown) defining the signal p and this signal is added to the positioning signal at 22. As mentioned before, both the differentiating stages may be replaced by a mathematical model known per se in order to avoid that the disturbance variables inherent to the pressure signal are amplified too heavy.

The embodiment shows a position controller for controlling the valve 10. The invention is not restricted thereto. Rather, the differentiated pressure signal may be supplied to an open loop control as well, if the feedback of the actual position value provided by the transducer 15 is to be eliminated.

What is claimed is:

1. A control system for a hydraulic power unit, comprising:

a valve;

an electronic controller coupled to the valve for controlling fluid communication between the power unit, a fluid pressure source and a reservoir;

a pressure sensor for providing a pressure signal in response to fluid pressure in a fluid line communicating with the hydraulic power unit; and a circuit for differentiating said pressure signal in single or multiple steps as a function of time to provide a pressure variation signal to be used for controlling said valve.

2. The control system of claim 1, wherein the circuit includes at least a differentiating stage.

3. The control system of claim 1, wherein the circuit is defined by a mathematical model.

4. The control system of claim 1, wherein the valve is controlled by said pressure variation signal for dampening low frequency hydraulic power units.

5. The control system of claim 1, wherein the valve is controlled by said pressure variation signal for dampening vibrations of large fluid volumes.

6. The control system of claim 1, wherein the valve is controlled by said pressure variation signal for a noise reduction of a stamping or nibbling machine.

7. The control system of claim 1, wherein said pressure variation signal is superimposed to the positioning signal of a control loop or an open control system.

8. The control system of claim 1, and further including means for adding the pressure variation signal to a positional signal from the controller for controlling the valve.

* * * * *